(12) United States Patent
Schiffer et al.

(10) Patent No.: US 10,984,178 B2
(45) Date of Patent: Apr. 20, 2021

(54) PROFILE GENERATOR

(71) Applicant: ADP, LLC, Roseland, NJ (US)

(72) Inventors: Jordan Schiffer, Brooklyn, NY (US); Hadar Yocobovitz, New York, NY (US); Gregory Peter Kavanagh, New York, NY (US); Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 16 days.

(21) Appl. No.: 14/677,198

(22) Filed: Apr. 2, 2015

(65) Prior Publication Data
US 2016/0027196 A1    Jan. 28, 2016

Related U.S. Application Data

(60) Provisional application No. 62/029,910, filed on Jul. 28, 2014.

(51) Int. Cl.
| | |
|---|---|
| *G06F 40/166* | (2020.01) |
| *G06F 40/106* | (2020.01) |
| *G06Q 10/06* | (2012.01) |
| *H04L 29/08* | (2006.01) |
| *G06T 11/20* | (2006.01) |
| *G06T 11/60* | (2006.01) |
| *G06K 9/00* | (2006.01) |
| *G06K 9/62* | (2006.01) |

(52) U.S. Cl.
CPC .......... *G06F 40/166* (2020.01); *G06F 40/106* (2020.01); *G06K 9/00288* (2013.01); *G06K 9/6201* (2013.01); *G06Q 10/06* (2013.01); *G06T 11/206* (2013.01); *G06T 11/60* (2013.01); *H04L 67/1053* (2013.01); *H04L 67/22* (2013.01); *H04L 67/306* (2013.01)

(58) Field of Classification Search
CPC ........ G06F 17/24; G06F 17/212; G06F 17/25; G06T 11/60; G06T 11/206; A63F 2300/5553; A63F 2300/6623; H04L 67/22; H04L 63/10; H04L 67/1053; H04L 67/306; G06K 9/00288; G06K 9/6201; G06Q 10/06
USPC ................................ 715/201, 202, 230, 255
See application file for complete search history.

(56) References Cited

U.S. PATENT DOCUMENTS

| | | |
|---|---|---|
| 5,485,556 A | 1/1996 | Takagi et al. |
| 5,835,880 A | 11/1998 | Gan et al. |
| 7,209,261 B2 | 4/2007 | Krueger et al. |

(Continued)

OTHER PUBLICATIONS

Office Action, dated Nov. 4, 2016, regarding U.S. Appl. No. 14/677,248, 22 pages.

(Continued)

*Primary Examiner* — Kavita Stanley
*Assistant Examiner* — Jenq-Kang Chu
(74) *Attorney, Agent, or Firm* — Yee & Associates, P.C.

(57) ABSTRACT

A method and apparatus for generating a profile page. A computer system identifies a group of potential profiles images from an image. The computer system identifies a group of features in the image. The computer system generates the profile page based on a potential profile image selected from the group of potential profile images and the group of features in the image. The computer system displays the profile page on a display system, enabling generating the profile page.

27 Claims, 13 Drawing Sheets

(56) References Cited

U.S. PATENT DOCUMENTS

| | | |
|---|---|---|
| 8,457,392 B2 | 6/2013 | Cavallaro et al. |
| 8,792,125 B2 | 7/2014 | Polit et al. |
| 8,913,085 B2 | 12/2014 | Anderson et al. |
| 9,264,437 B1* | 2/2016 | Tran .................. H04L 63/10 |
| 9,317,736 B1 | 4/2016 | Siddiqui |
| 9,374,399 B1 | 6/2016 | Lin et al. |
| 9,531,823 B1 | 12/2016 | Suchland et al. |
| 10,163,173 B1* | 12/2018 | McKinley ............ G06F 3/0484 |
| 2009/0144154 A1 | 6/2009 | Schein |
| 2010/0050090 A1* | 2/2010 | Leebow ................. G06F 3/048 |
| | | 715/751 |
| 2011/0182482 A1 | 7/2011 | Winters et al. |
| 2011/0268331 A1 | 11/2011 | Binning et al. |
| 2012/0054691 A1 | 3/2012 | Nurmi |
| 2012/0239506 A1* | 9/2012 | Saunders ............... G06Q 30/02 |
| | | 705/14.67 |
| 2013/0030987 A1 | 1/2013 | Zuckerberg et al. |
| 2013/0114864 A1 | 5/2013 | Garcia et al. |
| 2013/0191372 A1* | 7/2013 | Lee ................. G06F 17/30958 |
| | | 707/722 |
| 2013/0251201 A1 | 9/2013 | Zhou |
| 2013/0262588 A1* | 10/2013 | Barak .................... H04L 67/22 |
| | | 709/204 |
| 2013/0290414 A1 | 10/2013 | Rait et al. |
| 2013/0332832 A1 | 12/2013 | Lin |
| 2014/0019264 A1 | 1/2014 | Wachman et al. |
| 2014/0229479 A1 | 8/2014 | Sharafi et al. |
| 2015/0067023 A1* | 3/2015 | Al ........................ H04L 65/403 |
| | | 709/203 |
| 2015/0081725 A1 | 3/2015 | Ogawa et al. |
| 2015/0104082 A1* | 4/2015 | Kim .................. G06K 9/00221 |
| | | 382/118 |
| 2016/0004778 A1 | 1/2016 | Finder |
| 2016/0148298 A1* | 5/2016 | Tang ................. G06K 9/00288 |
| | | 705/26.7 |
| 2016/0224871 A1 | 8/2016 | Koren et al. |

OTHER PUBLICATIONS

Schiffer et al., "Networking in a Social Network," U.S. Appl. No. 14/677,248, filed Apr. 2, 2015, 47 pages.
Office Action, dated Sep. 13, 2017, regarding U.S. Appl. No. 14/677,248, 14 pages.
Final Office Action, dated May 18, 2017, regarding U.S. Appl. No. 14/677,248, 13 pages.
Final Office Action, dated Jan. 29, 2018, regarding U.S. Appl. No. 14/677,248, 19 pages.
Office Action, dated Jun. 1, 2018, regarding U.S. Appl. No. 14/677,248, 15 pages.
Office Action, dated Mar. 21, 2019, regarding U.S. Appl. No. 14/677,248, 17 pages.
Final Office Action, dated Sep. 18, 2019, regarding U.S. Appl. No. 14/677,248, 21 pages.
Final Office Action, dated Nov. 29, 2018, regarding U.S. Appl. No. 14/677,248, 16 pages.
Office Action, dated Feb. 21, 2020, regarding U.S. Appl. No. 14/677,248, 28 pages.
Notice of Allowance, dated Apr. 30, 2020, regarding U.S. Appl. No. 14/677,248, 12 pages.

* cited by examiner

PROFILE GENERATOR

This application claims the benefit of U.S. Provisional Patent Application Ser. No. 62/029,910, filed Jul. 28, 2014, and entitled "Dynamic User Interface."

BACKGROUND INFORMATION

1. Field

The present disclosure relates generally to an improved computer system and, in particular, to a method and apparatus for generating content in a social network. Still more particularly, the present disclosure relates to a method and apparatus for generating profile pages for people in a social network.

2. Background

Social networks provide a platform for people to build networks. These networks may include people who share interests, activities, backgrounds, work, or real life connections. The social networks may be used for personal or business reasons. A social network used for business reasons is a professional network.

A professional network provides people with a way to perform networking, share ideas, find resources for projects, find jobs, hire people, obtain information, and other suitable activities. A professional network may be within an organization or may extend broadly across the Internet.

People may form connections to other people in a number of different ways. For example, a person may form connections with other people that the person already knows. As another example, a person may search the social network for people and establish connections based on who they find. For example, a person may search for people who work at the same company or have similar work interests. The search also may include finding other people based on colleges attended, education, experience, skills, locations, business goals, and other factors.

For example, when a person looks for a new connection, that person may review profile pages of people returned in searches to determine whether to request a connection. Other people may also review the profiles of the person requesting a connection in determining whether to accept a request for a connection.

Thus, the profile page is an important part of generating interest from others in the professional network for a person that desires to establish connections and expand their network. However, generating and keeping a profile page up-to-date may be more time-consuming and tedious than desired.

Currently, some professional network sites may have an automated process for creating a profile page. The process may include prompting a person to enter or select information for a profile page. For example, the process may ask a person for information about education, work experience, skills, interests, and other information for a profile page. The process may also ask the person to upload a profile picture or other pictures for use on the profile page.

Often times, a person may not complete the process and the profile page may be only partially completed. For example, the person may not upload a profile picture because the person may not have one readily available that is in a form for use as a profile picture. After the initial profile page is completed, the person may not make changes to update the pages as often as desired. Thus, a technical problem is present with generating profile pages as quickly and easily as desired.

Therefore, it would be desirable to have a method and apparatus that takes into account at least some of the issues discussed above, as well as other possible issues. For example, it would be desirable to have a method and apparatus to generate profile pages more easily.

SUMMARY

An embodiment of the present disclosure provides a method for generating a profile page. A computer system identifies a group of potential profiles images from an image. The computer system identifies a group of features in the image. The computer system generates the profile page based on a potential profile image selected from the group of potential profile images and the group of features in the image. The computer system displays the profile page on a display system, enabling generating the profile page.

Another embodiment of the present disclosure provides a computer system comprising a display system and a profile generator in communication with the display system. The profile generator identifies a group of potential profile images from an image. The profile generator also identifies a group of features in the image. Further, the profile generator generates a profile page based on a potential profile image selected from the group of potential profile images and the group of features in the image. Still further, the profile generator displays the profile page on the display system, enabling generating the profile page.

Yet another embodiment of the present disclosure provides a computer program product for generating a profile page. The computer program product comprises a computer readable storage media, and first program code, second program code, third program code, and fourth program code stored on the computer readable storage media. The first program code identifies a group of potential profile images from an image. The second program code identifies a group of features in the image. The third program code generates the profile page based on a potential profile image selected from the group of potential profile images and the group of features in the image. The fourth program code displays the profile page on a display system, enabling generating the profile page.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current processes for generating a profile page take more time than desired. The illustrative embodiments recognize and take into account that currently available processes in social networks ask a user to enter information to create a profile page. The illustrative embodiments also recognize and take into account that customizing a profile page is more difficult than desired. For example, colors, fonts, and other graphical elements for a profile page may be selected by a user. This selection, however, may require more time and effort than desired by a user.

Therefore, the illustrative embodiments provide a method and apparatus for generating a profile page. In one illustrative example, a method is present for generating a profile page. A group of potential profile images is identified from an image. A group of features for the image is identified. A profile page is generated based on a potential profile image selected from the group of potential profile images and the group of features identified from the image. The profile page is then displayed.

Figure 1:
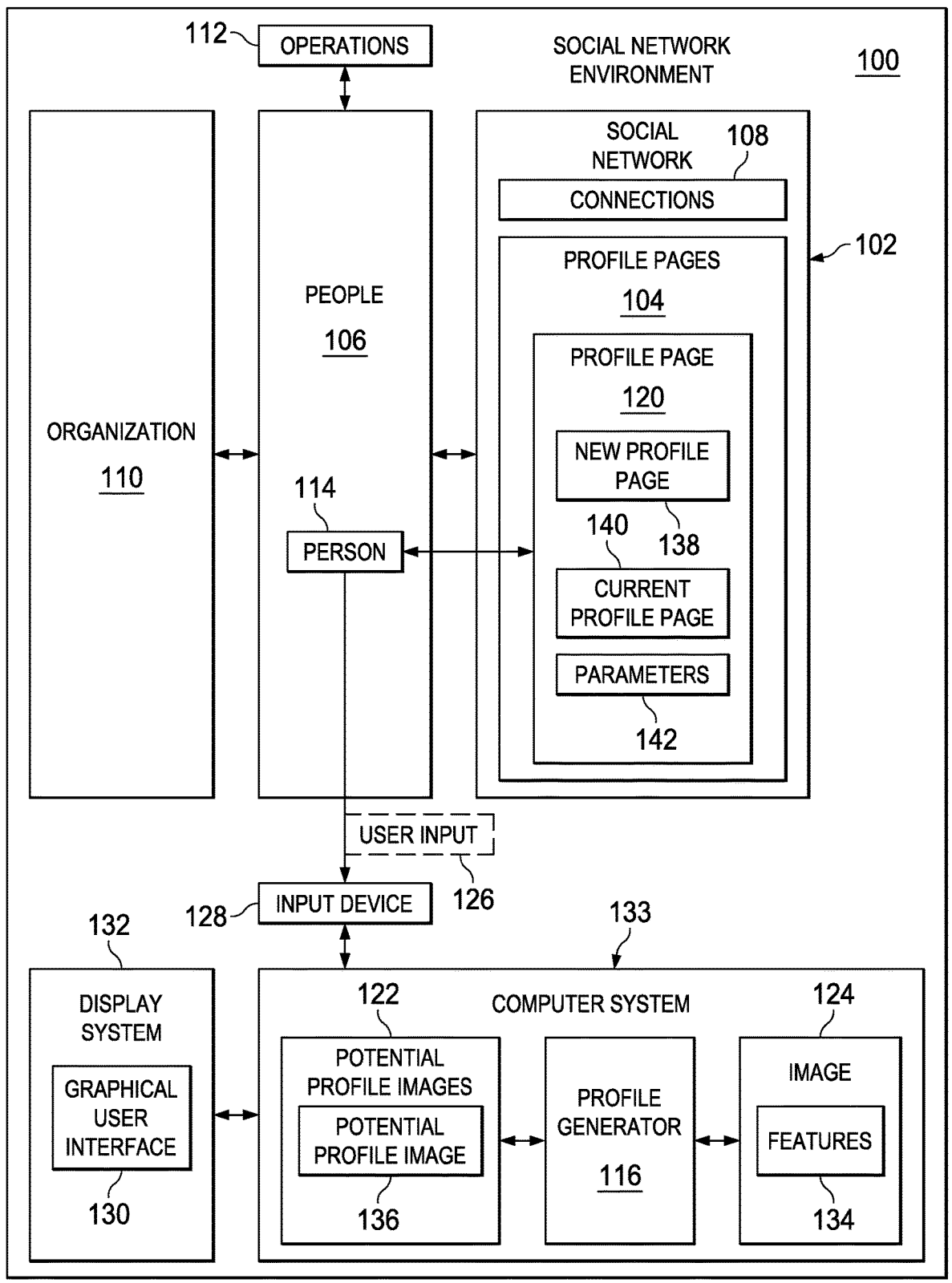
FIG. 1 is an illustration of a block diagram of a social networking environment in accordance with an illustrative embodiment.

With reference to the figures and in particular with reference to FIG. 1, an illustration of a block diagram of a social networking environment is depicted in accordance with an illustrative embodiment. In this example, social network environment 100 is an environment in which social network 102 has profile pages 104 for people 106.

People 106 establish connections 108 in social network 102. In one illustrative example, people 106 may be part of organization 110. Organization 110 may take various forms. For example, organization 110 may be a company, a charity, a government entity, an educational group, a social group, a team, or some other suitable organization.

Social network 102 may be used by people 106 within organization 110 to perform operations 112. For example, operations 112 may include at least one of networking, setting up teams, assigning tasks, creating departments, generating business plans, generating organizational charts, obtaining information, or other operations that may be performed by people 106 in organization 110.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, person 114 in people 106 may view profile pages 104 to identify people 106 with which they want to establish connections. Person 114 may view profile pages 104 to obtain information about people 106. This information may be used to perform operations 112. Additionally, person 114 may establish connections 108 to form a network for performing operations 112.

In the illustrative example, profile generator 116 generates profile pages 104 for social network 102. The generation of profile pages 104 by profile generator 116 may include at least one of creating a new profile page or making changes to an existing profile page.

As depicted, profile generator 116 generates profile page 120 in profile pages 104. In this example, profile page 120 is for person 114. Profile page 120 may take the form of a webpage or other suitable type of data structure for use in social network 102.

In this illustrative example, profile generator 116 identifies a group of potential profile images 122 from image 124. The group of potential profile images 122 may be selected from at least one of a group of faces or a group of objects in image 124.

Image 124 may be selected from user input 126 from person 114 through input device 128. Additionally, user input 126 may be used to select potential profile image 136 from potential profile images 122. Potential profile image 136 may be the image used to create profile page 120. In this illustrative example, potential profile image 136 may be an image of person 114 for which profile page 120 is being generated.

For example, person 114 may interact with profile generator 116 through graphical user interface 130 displayed on display system 132 for computer system 133. Display system 132 is a hardware system and includes one or more display devices on which graphical user interface 130 may be displayed. The display devices may include at least one of a light emitting diode display (LED), a liquid crystal display (LCD), and organic light emitting diode display (OLED), or some other suitable device on which graphical user interface 130 can be displayed.

Person 114 may interact with graphical user interface 130 through user input 126 generated by input device 128 in computer system 133. Input device 128 may be, for example, a mouse, a keyboard, a trackball, a touchscreen, a stylus, or some other suitable type of input device.

Profile generator 116 identifies a group of features 134 in image 124. The group of features 134 in image 124 may include features, which are things seen in image 124. For example, the group of features 134 may be selected from at least one of a person, a face of a person, a car, a stadium, a building, an animal, a piece of equipment, a piece of apparel, a piece of furniture, an aircraft, a spacecraft, a planet, a logo, or some other suitable feature in image 124.

As depicted, profile generator 116 generates profile page 120 based on potential profile image 136 selected from potential profile images 122 and the group of features 134 in image 124. Profile generator 116 displays profile page 120 in graphical user interface 130 in display system 132.

In the illustrative example, profile page 120 generated by profile generator 116 may take a number different forms. For example, profile page 120 may be selected from one of new profile page 138 or a modification of current profile page 140.

In the illustrative example, person 114 may interact with graphical user interface 130 and send user input 126 while profile page 120 is displayed in graphical user interface 130 and display system 132. User input 126 may be used to adjust a group of parameters 142 for profile page 120. The group of parameters 142 may affect how and what is displayed in profile page 120. In this illustrative example, a group of parameters 142 may take a number of different forms. For example, a group of parameters 142 may be selected from at least one of a first position of the potential profile image selected, a second position of content on the profile page, a third position of a background image, or some other suitable parameter. In another illustrative example, group of parameters 142 may be colors for profile page 120. In still another illustrative example, parameters 142 may be text size, font, or other suitable parameters.

Profile generator 116 may be implemented in software, hardware, firmware or a combination thereof. When software is used, the operations performed by profile generator 116 may be implemented in program code configured to run on hardware, such as a processor unit. When firmware is used, the operations performed by profile generator 116 may be implemented in program code and data and stored in persistent memory to run on a processor unit. When hardware is employed, the hardware may include circuits that operate to perform the operations in profile generator 116.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors. In this illustrative example, profile generator 116 may be implemented in computer system 133.

In this manner, profile generator 116 may automatically lay out profile page 120. This layout may include the location of images, colors used, graphics, and other features of profile page 120.

Computer system 133 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

Figure 2:
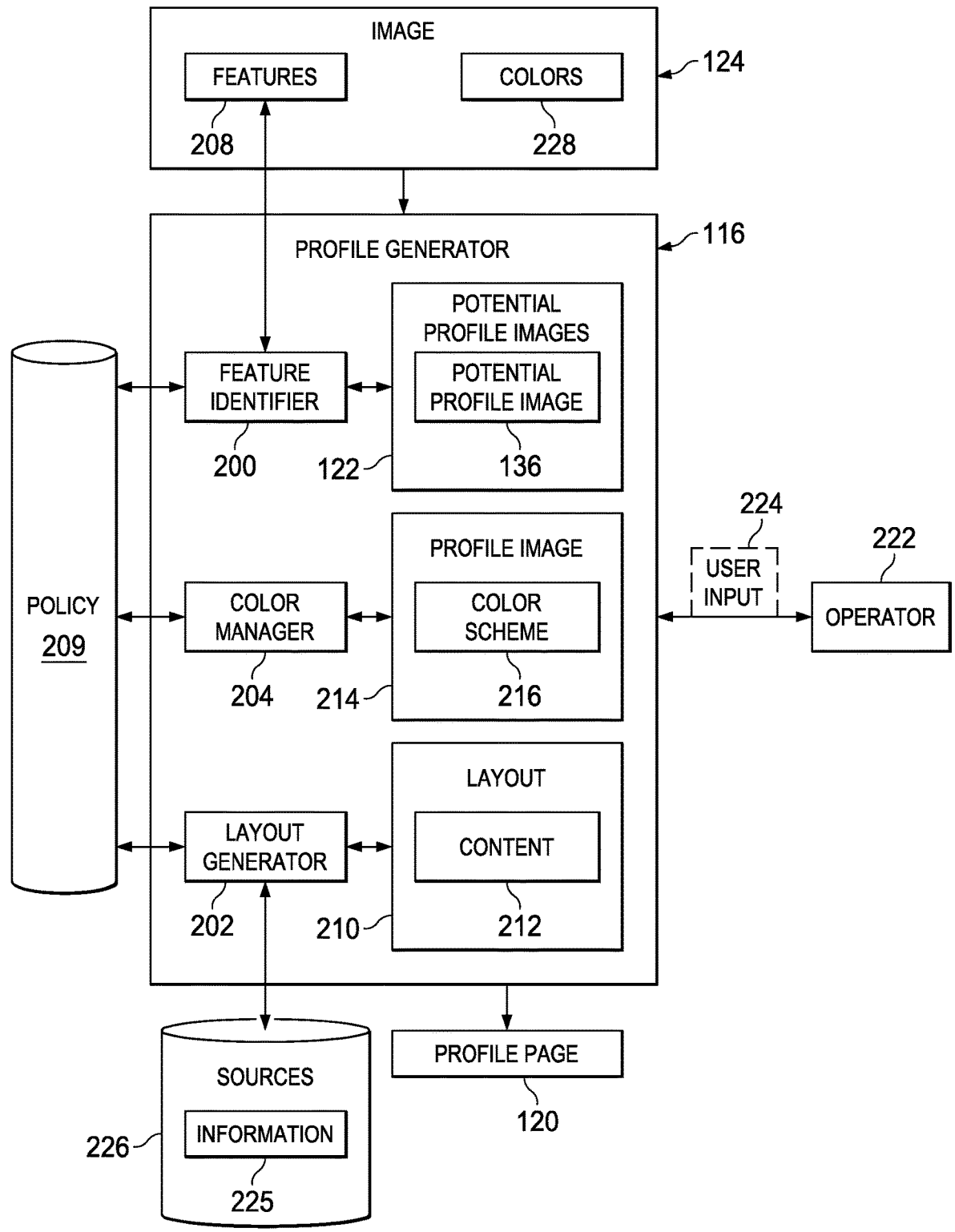
FIG. 2 is an illustration of a block diagram of a profile generator in accordance with an illustrative embodiment.

With reference next to FIG. 2, an illustration of a block diagram of a profile generator is depicted in accordance with an illustrative embodiment. In this illustrative example, components that may be used to implement profile generator 116 are shown.

Profile generator 116 may include a number of different components. For example, profile generator 116 may include feature identifier 200, layout generator 202, and color manager 204. In this illustrative example, feature identifier 200 may identify a group of features 208 in image 124.

Features 208 may be identified using policy 209. Policy 209 is one or more rules that may be used to identify features 208. For example, policy 209 may include rules that identify features based on at least one of the percent of visibility of a feature, tag information in the image, information from a description for profile page 120 to identify a feature, an image color, or other suitable rules or parameters.

In identifying features 208, feature identifier 200 identifies a group of potential profile images 122. When the group of potential profile images 122 are for person 114, the group of potential profile images 122 are faces of people identified in image 124.

In this illustrative example, operator 222 generates user input 224 that selects potential profile image 136 from the group of potential profile images 122 as profile image 214 for use in generating profile page 120. In this particular example, image 124 may be a background image for profile page 120.

In this illustrative example, operator 222 may be person 114 for which profile page 120 is being generated. In other illustrative examples, operator 222 may be another person other than person 114.

As depicted, layout generator 202 generates layout 210. In this illustrative example, layout 210 is part of a graphic design for profile page 120. Layout 210 identifies an arrangement of content 212.

In this illustrative example, content 212 may include various types of information. For example, content 212 may include text, graphics, images, video, icons, and other types of content for profile page 120.

The generation of layout 210 may be performed using policy 209. In this illustrative example, policy 209 also may include rules that govern how layout 210 is generated. For example, policy 209 may include one or more rules for layout 210 selected from one of a minimum and maximum text size; a minimum and maximum image size; a preferred range of image to text ratio; a preferred range of image locations; increase page legibility; increase image visibility; increase page aesthetics; focus a viewer on certain portions of the page; or other suitable rules.

For example, content 212 may include text, images, graphics, buttons, links, and other graphical elements that may be in profile page 120. Layout generator 202 may identify locations for content 212, such as a profile image, a background image, buttons, text, and other graphical elements.

In this illustrative example, layout generator 202 identifies content 212 for profile page 120. In some illustrative examples, content 212 includes information 225 about person 114. Information 225 may be received through a group of sources 226. For example, the group of sources 226 may include at least one of user input 126 from person 114 in FIG. 1, a human resources database, an organization chart, other profile pages, a social networking database, or some other suitable source.

In this illustrative example, operator 222 may generate user input 224 that changes layout 210. In this manner, operator 222 may customize or adjust layout 210 after its generation by layout generator 202.

In this illustrative example, color manager 204 identifies color scheme 216 for profile page 120. Color scheme 216 identifies colors that may be used for content 212 in profile page 120. Color scheme 216 may be based on a group of colors 228 identified in image 124. The group of colors 228 may be a color palette extracted from image 124.

For example, the group of colors 228 may be for the group of features 208 identified in image 124. For example, the group of colors 228 may be identified for a feature in the form of a stadium, a car, or other object identified in image 124. As yet another example, the group of colors 228 may be identified based on colors in two or more of features 208. In another illustrative example, the group of colors 228 may be based on colors 228 found in image 124 as a whole.

As depicted, color scheme 216 may be generated using policy 209. In this illustrative example, policy 209 also includes rules on the generation of color scheme 216. For example, policy 209 may specify generating color scheme 216 based on at least one of the dominant colors in potential profile image 136 has selected for use; complimentary colors to those in potential profile image 136 selected for use; an aesthetic rule set; color specification based on text field [type/content/metadata]; saturation based on text field; gradation based on text field; transparency based on text field, or other suitable factors.

As another example, policy 209 may satisfy generating color scheme 216 based on the school attended by person 114, prior companies at which person 114 has worked, clubs that person 114 belongs to, or other suitable factors. For example, color scheme 216 may be selected to follow the color scheme of the college attended by person 114.

In this illustrative example, color scheme 216 may be initially generated by color manager 204. Afterwards, operator 222 may generate user input 224 that changes or modifies color scheme 216.

In one illustrative example, one or more features in the group of features 208 may be selected by operator 222 through user input 224. In another illustrative example, policy 209 may be used to provide waiting for different features found in the group of features 208. In other words, color manager 204, or some other components in profile generator 116, may select one or more features for use in generating color scheme 216.

As a result, computer system 133 operates as a special purpose computer system in which profile generator 116 in computer system 133 enables the generation of profile pages 104 in FIG. 1. For example, profile generator 116 enables generating profile page 120 with reduced user input. As a result, profile pages 104 may be more quickly generated as compared to current systems that require more user input to generate profile pages 104. In particular, profile generator 116 transforms computer system 133 into a special purpose computer system that functions more efficiently, more quickly, or more efficiently and more quickly in generating profile pages 104 as compared to currently available general computer systems that do not have profile generator 116.

Computer system 133 with profile generator 116 in FIG. 1 performs a transformation of data that may be found in different locations. This data may include images, content, color schemes, buttons for a profile page, and other items. This data is transformed into a format and has a different function or different use. In particular, this information is transformed into profile page 120 in the illustrative example.

In this manner, profile generator 116 provides a technical solution to the problem with generating profile pages 104 as easily and quickly as desired. With profile generator 116, the generation of profile pages 104 may occur more quickly. For example, with organization 110 in the form of a company, a person may be tasked with generating profile pages 104 for social network 102 for people 106 in the form of a company directory. Generation of profile pages 104 for this directory in social network 102 may be performed more quickly and easily using profile generator 116.

The illustration of social network environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, profile page 120 may be generated for an object other than person 114. The object may be selected from one of a car, a stadium, a building, an animal, an aircraft, a spacecraft, a planet, an organization, or some other suitable type of object. In still another illustrative example, profile page 120 may be used for other purposes other than social network 102. For example, profile page 120 may be part of a directory for organization 110.

Figure 3:
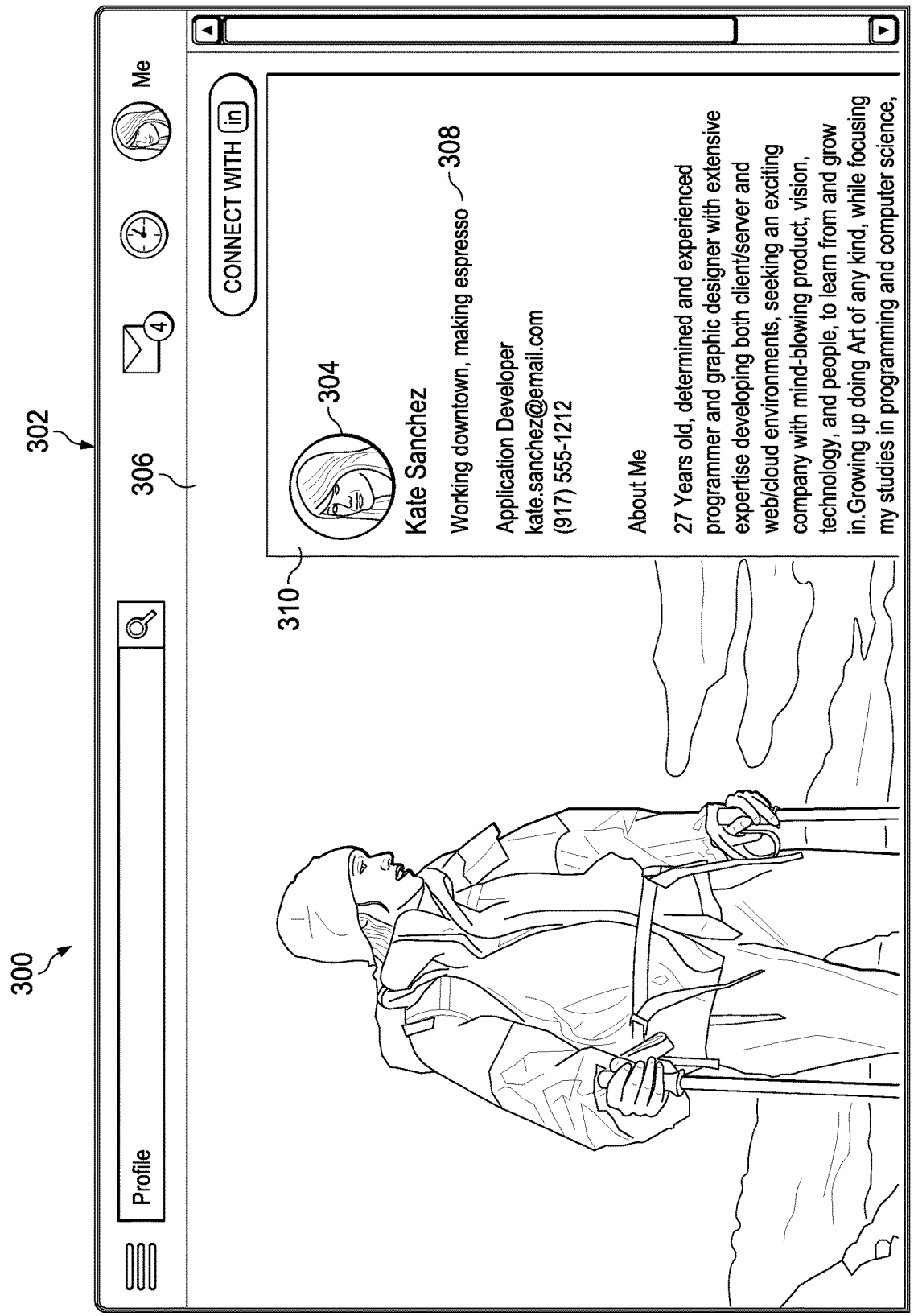
FIG. 3 is an illustration of a default profile page in accordance with an illustrative embodiment.

With reference next to FIGS. 3-10, illustrations of the generation of a profile page are depicted in accordance with an illustrative embodiment. With reference to FIG. 3, an illustration of a default profile page is depicted in accordance with an illustrative embodiment. In this illustrative example, graphical user interface 300 shows default profile page 302. Default profile page 302 is a template that may be modified to create a profile page for a person.

In this example, default profile page 302 includes profile image 304 and background image 306. Text 308 is found in section 310 of default profile page 302

Figure 4:
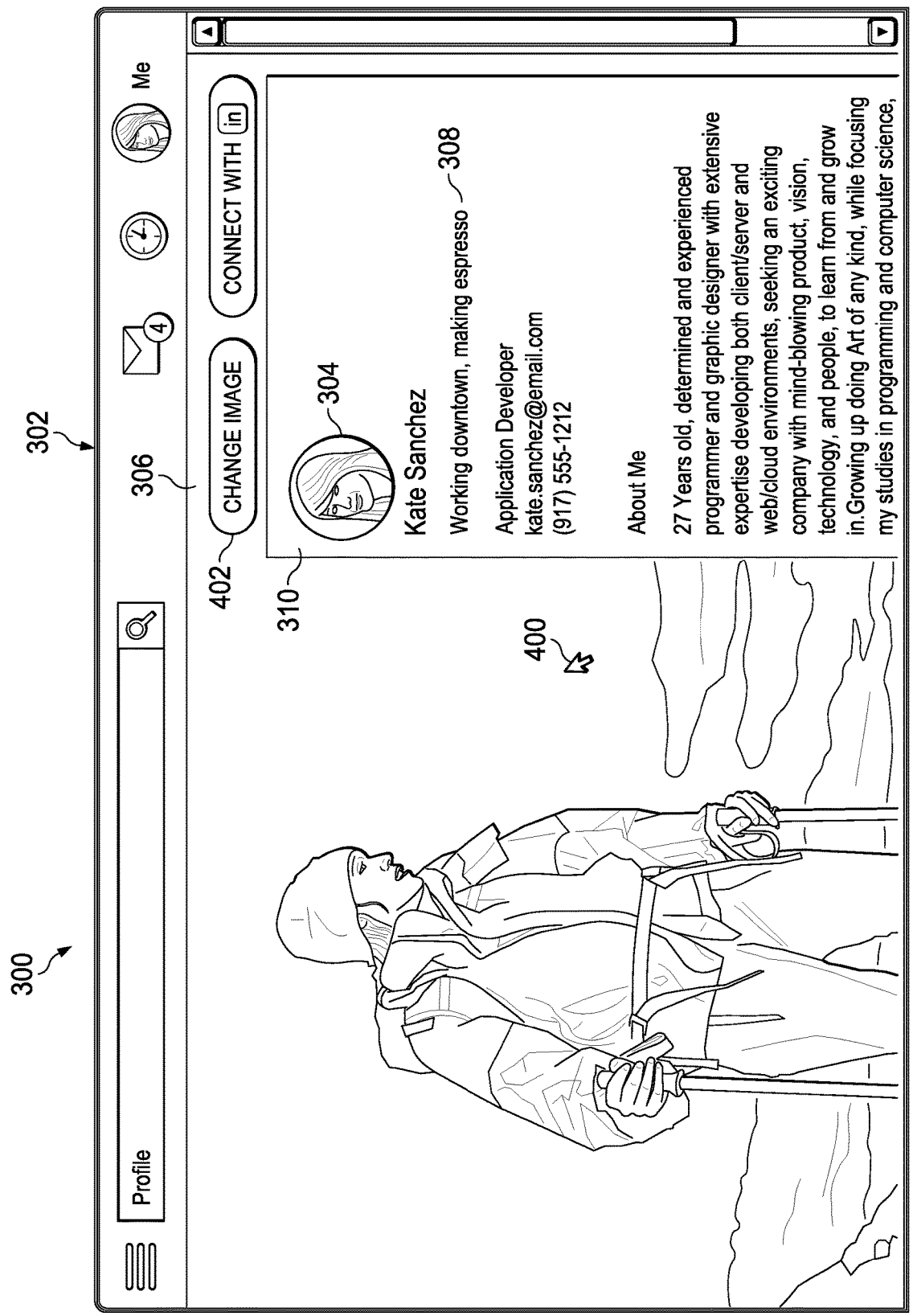
FIG. 4 is an illustration of a graphical control for changing an image in accordance with an illustrative embodiment.

Turning next to FIG. 4, an illustration of a graphical control for changing an image is depicted in accordance with an illustrative embodiment. In this figure, pointer 400 in graphical user interface 300 has been moved over background image 306. With pointer 400 located over background image 306, change image button 402 is displayed on default profile page 302. In the illustrative example, change image button 402 is an example of a graphical control that may be used to select a new image for a profile page. As depicted, change image button 402 allows the operator to change at least one of profile image 304 or background image 306.

Figure 5:
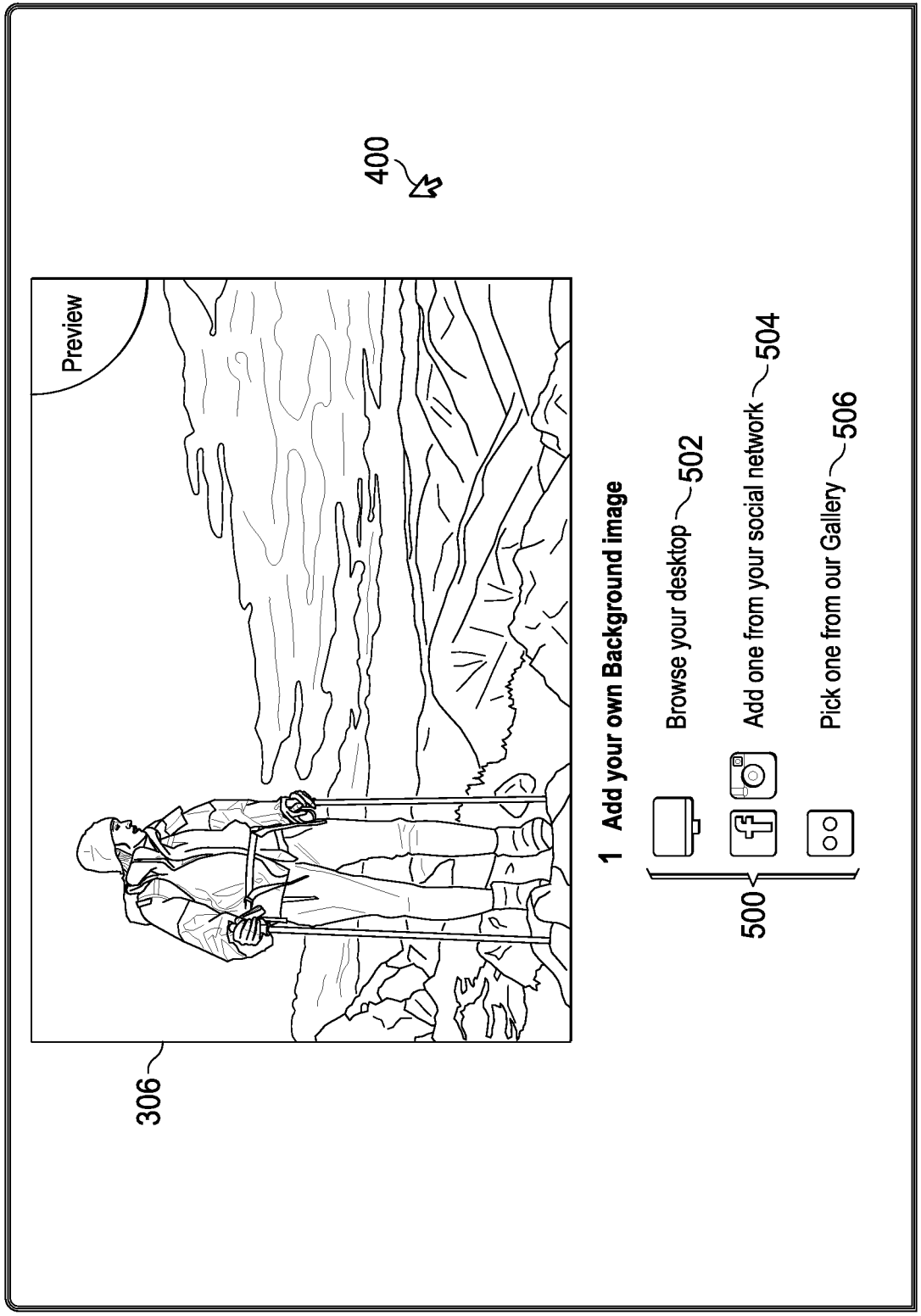
FIG. 5 is an illustration of upload options for generating a profile page in accordance with an illustrative embodiment.

With reference next to FIG. 5, an illustration of upload options for generating a profile page is depicted in accordance with an illustrative embodiment. In this figure, options 500 are displayed in graphical user interface 300 when change image button 402 is selected in FIG. 4.

Options 500 provide a number different ways for a person to select an image. In this example, the image is a background image to replace background image 306. As depicted, options 500 include "browse your desktop" 502, "add one from your social network" 504, and "pick one from our gallery" 506.

Figure 6:
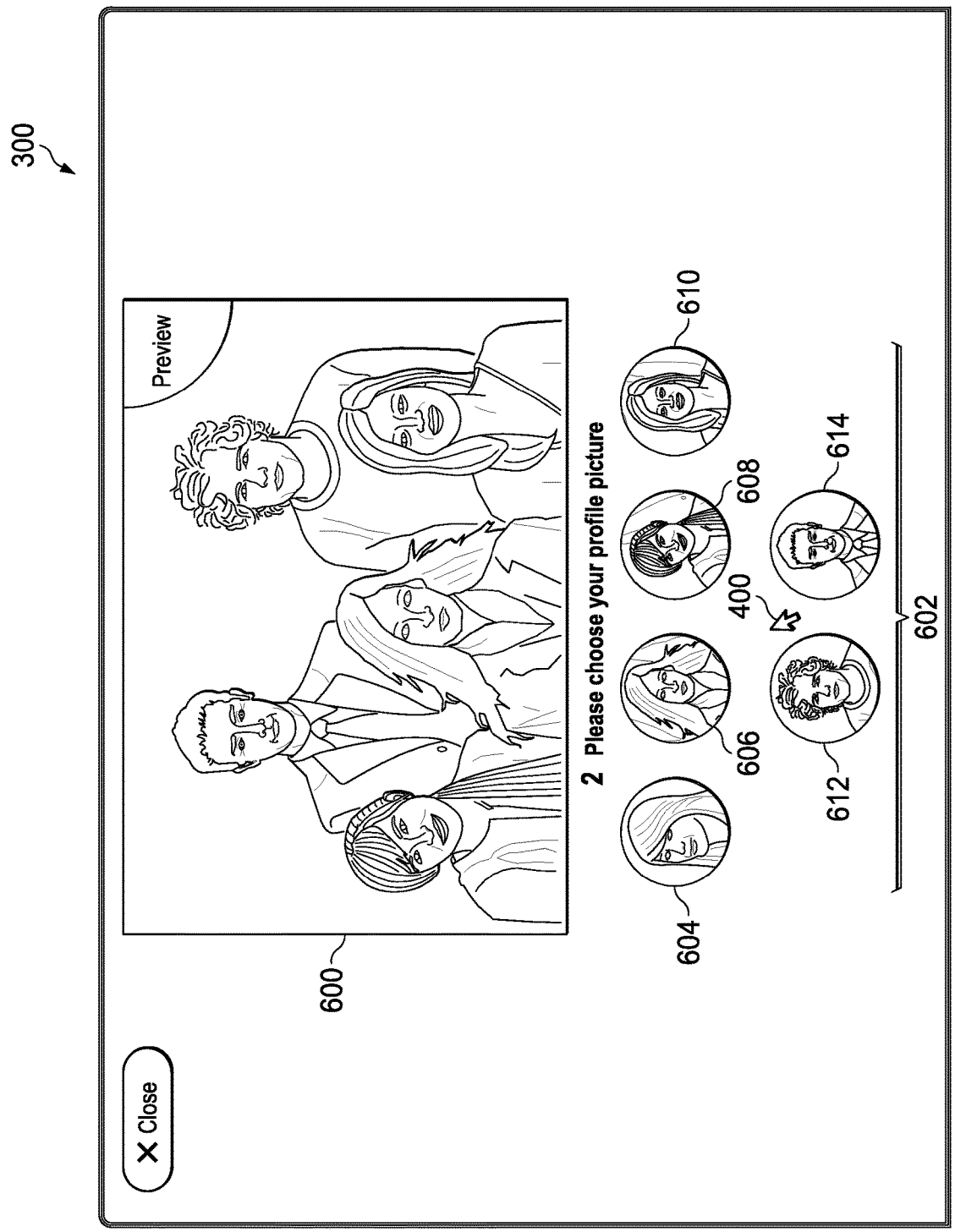
FIG. 6 is an illustration of an image uploaded for a profile page in accordance with an illustrative embodiment.

In FIG. 6, an illustration of an image uploaded for a profile page is depicted in accordance with an illustrative embodiment. In this illustrative example, image 600 is displayed in graphical user interface 300. Image 600 has been uploaded using one of options 500 in FIG. 5.

In this illustrative example, potential profile images 602 are shown in graphical user interface. Potential profile images 602 have been identified from image 600. Potential profile images 602 may be generated by feature identifier 200 shown in block form in FIG. 2 in this illustrative example.

As depicted, potential profile images 602 are images containing faces from people in image 600. Potential profile images 602 includes potential profile image 604, potential profile image 606, potential profile image 608, potential profile image 610, potential profile image 612, and potential profile image 614.

Figure 7:
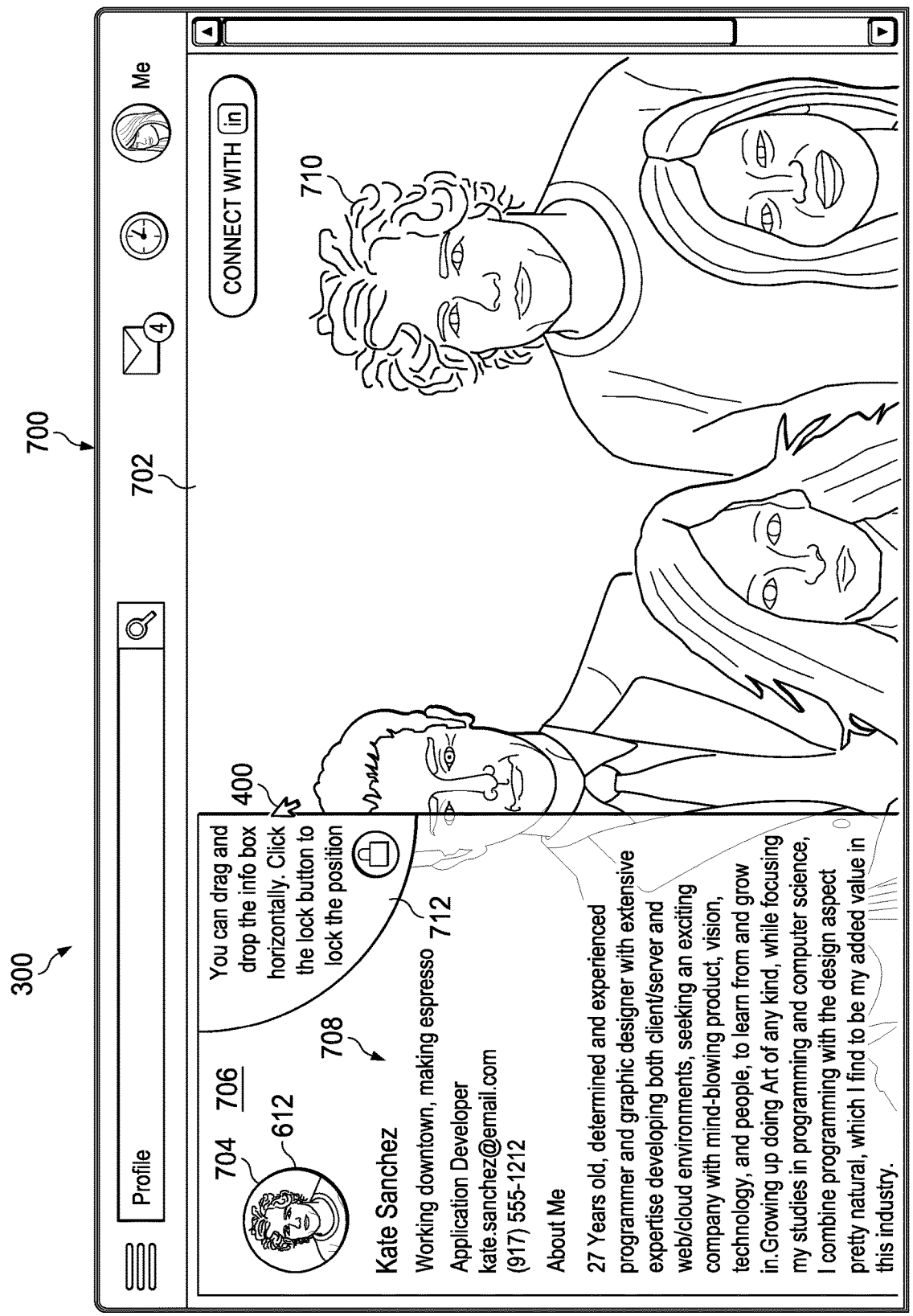
FIG. 7 is an illustration of a profile page in accordance with an illustrative embodiment.

Turning next to FIG. 7, an illustration of a profile page is depicted in accordance with an illustrative embodiment. In this illustrative example, profile page 700 is shown in graphical user interface 300. Profile page 700 is a result of changes to default profile page 302 in FIG. 3. Profile page 700 may be generated by layout generator 202 shown in block form in FIG. 2. In this example, profile page 700 is automatically generated without needing user input.

In this example, profile page 700 includes image 600 in FIG. 6 as background image 702 and potential profile image 612 as profile image 704. Profile image 704 is located in section 706 with other content in the form of text 708.

As depicted, the content in section 706 is positioned to avoid overlap of face 710 in background image 702. Face 710 is the face in potential profile image 612 used as profile image 704 in this illustrative example.

Additionally, the layout of profile page 700 may be adjustable by the user. In other words, manual adjustments may be made to profile page 700 after profile page 700 is generated by layout generator 202.

In this illustrative example, graphical control 712 is shown as being associated with section 706 and profile page 700. Graphical control 712 may be selected by user input and used to change the position of section 706. Graphical control 712 is a graphical element that may be used to change the manner in which a portion of profile page 700 is displayed.

The user may move section 706 to a desired location in profile page 700. This movement may be performed by moving pointer 400 to graphical control 712 and selecting graphical control 712. At this point, section 706 may be movable to different positions on profile page 700.

When section 706 is in a desired location, the user may deselect graphical control 712. The deselection results in section 706 being locked in its current position. This type of adjustability of profile page 700 may be provided through layout generator 202 shown in block form in FIG. 2.

Figure 8:
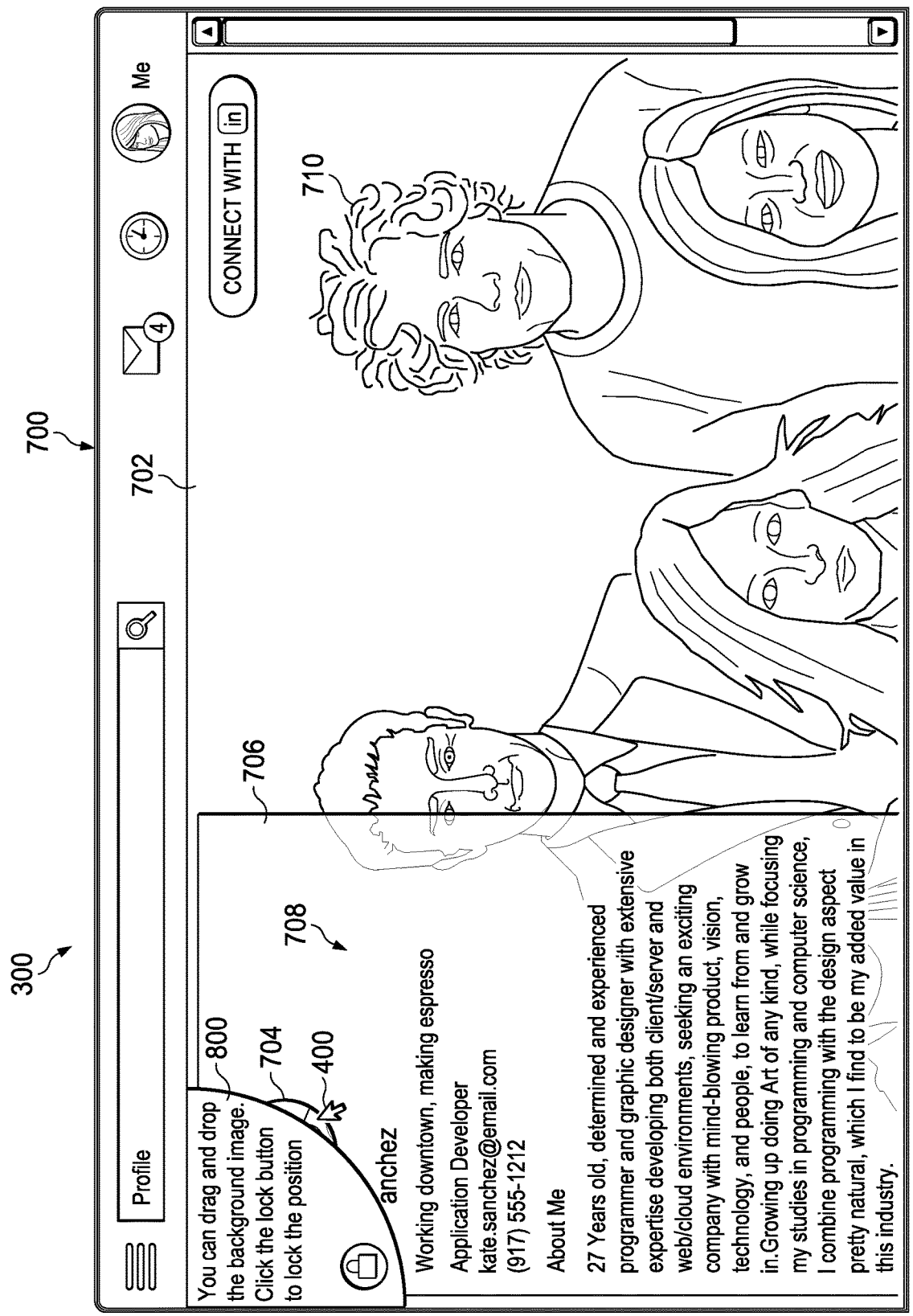
FIG. 8 is an illustration of a profile page in accordance with an illustrative embodiment.

With reference next to FIG. 8, an illustration of a profile page is depicted in accordance with an illustrative embodiment. In this depicted example, graphical control 800 is shown in association with background image 702. Graphical control 800 may be selected by user input to change the position of background image 702 as seen on profile page 700. In other words, background image 702 may be larger than shown in profile page 700. As result, background image 702 may be moved such that different portions of background image 702 are visible when profile page 700 is displayed.

Figure 9:
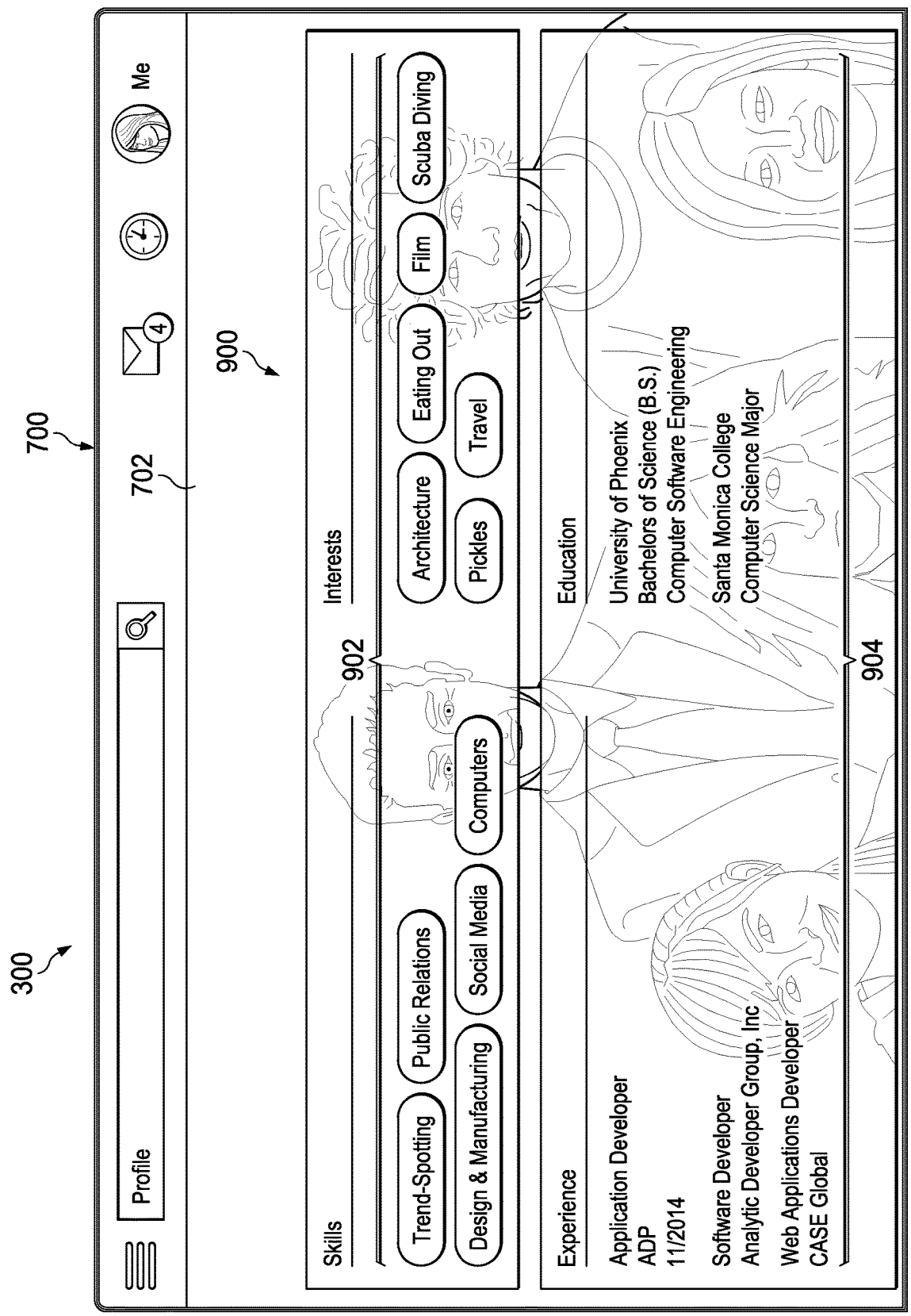
FIG. 9 is an illustration of a profile page in accordance with an illustrative embodiment.

With reference now to FIG. 9, an illustration of a profile page is depicted in accordance with an illustrative embodiment. In this illustrative example, color scheme 900 is used in profile page 700. In particular, color scheme 900 is applied to buttons 902. Color scheme 900 also may be applied to content such as text 904 as well as other portions of profile page 700. In this illustrative example, color scheme 900 may be generated and applied by color manager 204 shown in block form in FIG. 2. In this illustrative example, the colors used in color scheme 900 may be a color palette extracted from image 600 as uploaded by the user.

Figure 10:
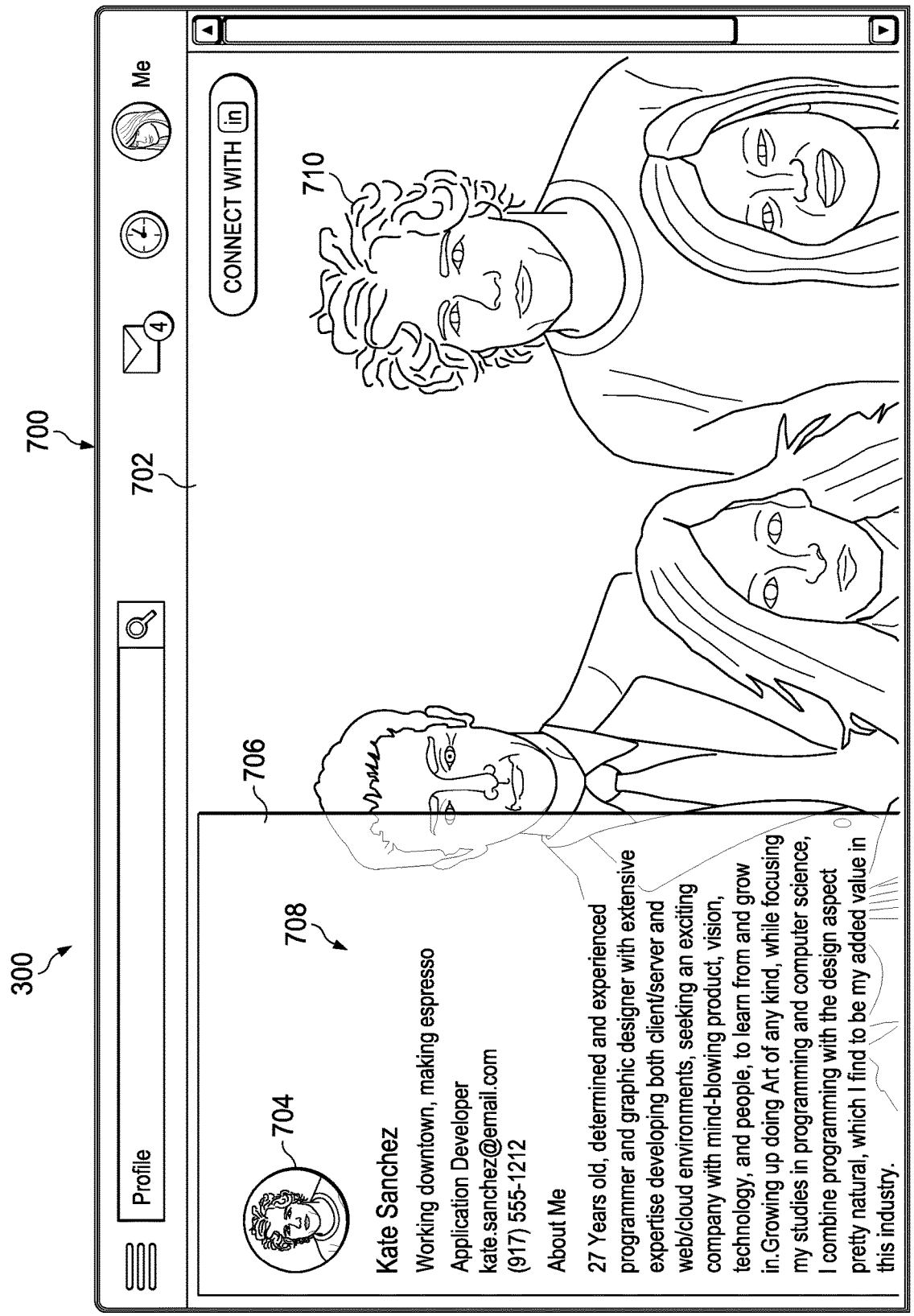
FIG. 10 is an illustration of a profile page in accordance with an illustrative embodiment.

With reference now to FIG. 10, an illustration of a profile page is depicted in accordance with an illustrative embodiment. In this figure, the generation of profile page 700 has been completed. As shown in FIGS. 3-10, profile page 700 is generated automatically and may be adjusted through user input.

The generation of profile page 700 as shown in FIGS. 3-10 are examples of one manner in which a profile page may be generated and not meant to limit the manner in which profile pages may be generated in social network environment 100. For example, other types of customizations may be performed by a user when creating a profile page. These customizations may include moving content within section 706. For example, a user may change the location of profile image 704 in section 706. As another illustrative example, color scheme 900 may be adjusted by the user.

In still another illustrative example, profile page 700 may be generated from scratch rather than using default profile page 302. For example, prompts may be used to request an image from a user. In still other illustrative examples, the profile page may be for an object other than a person. For example, the profile page may be for an organization, a vehicle, a pet, or some other suitable object.

In yet another illustrative example, a company logo may be identified and placed on profile page 700. The company logo may be identified from an employment history for the person for which profile page 700 is generated. In yet another illustrative example, color scheme 900 may be generated based on a sports team identified for the person.

Figure 11:
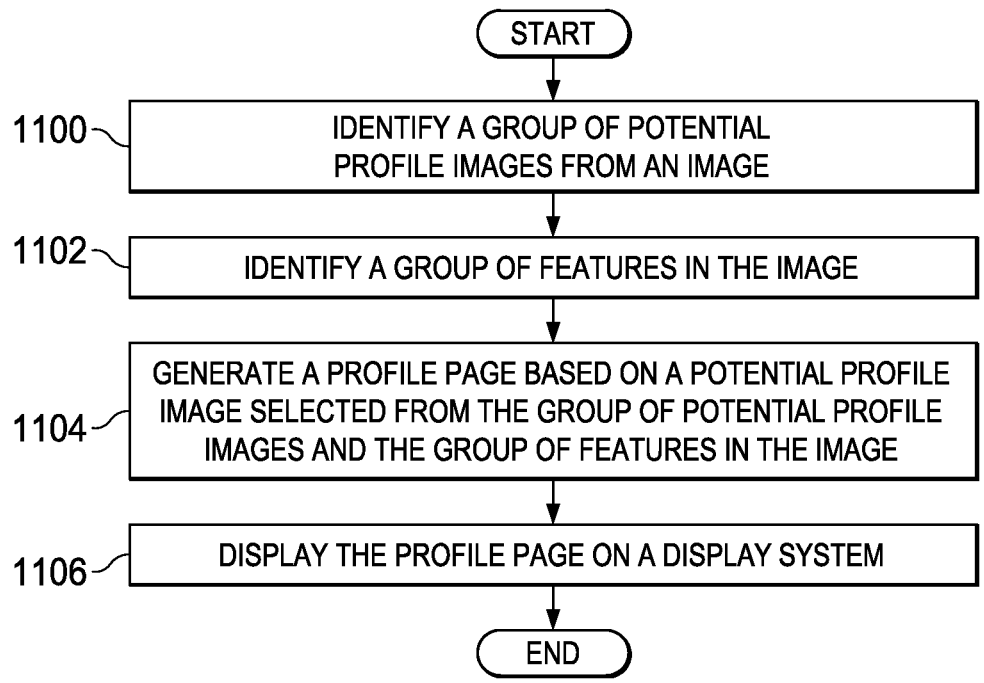
FIG. 11 is an illustration of a flowchart of a process for generating a profile page in accordance with an illustrative embodiment.

Turning next to FIG. 11, an illustration of a flowchart of a process for generating a profile page is depicted in accordance with an illustrative embodiment. The process illustrated FIG. 11 may be implemented in social network environment 100 shown in block form in FIG. 1. In particular, the different steps in this process may be implemented in profile generator 116 in computer system 133 in FIG. 1.

The process begins by identifying a group of potential profile images from an image (step 1100). Next, the process identifies a group of features in the image (step 1102).

The process then generates a profile page based on a potential profile image selected from the group of potential profile images and the group of features in the image (step 1104). The process then displays the profile page on a display system (step 1106), with the process terminating thereafter.

Figure 12:
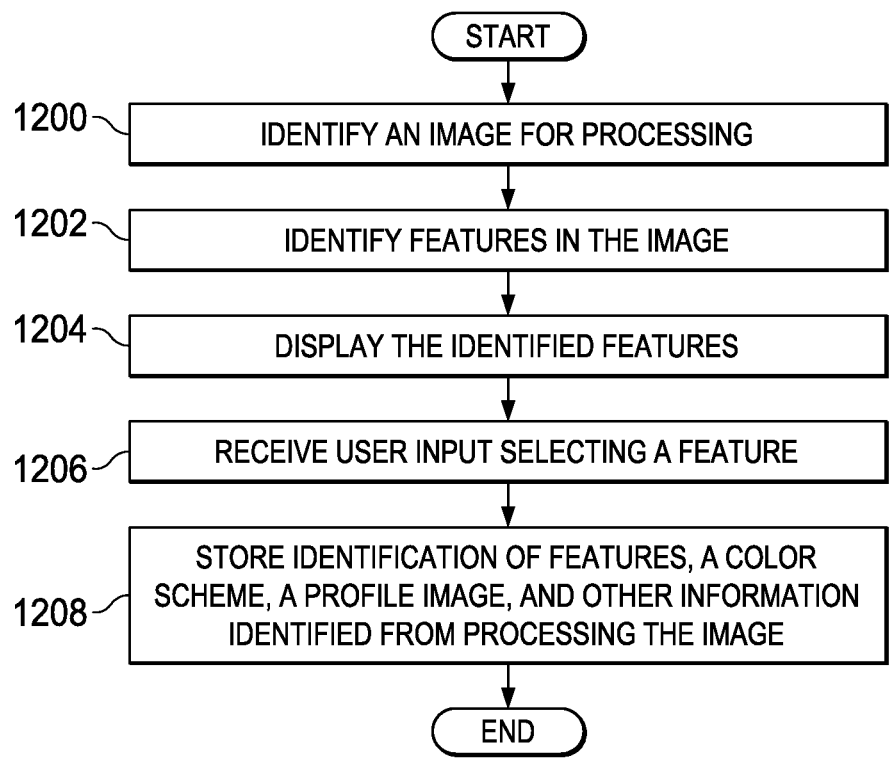
FIG. 12 is an illustration of a flowchart of a process for identifying features in accordance with an illustrative embodiment.

Turning next to FIG. 12, an illustration of a flowchart of a process for identifying features is depicted in accordance with an illustrative embodiment. The process illustrated FIG. 12 may be implemented in feature identifier 200 for profile generator 116 shown in block form in FIG. 2.

The process begins by identifying an image for processing (step 1200). The image may be identified by user input or may be located in a directory or other data structures.

The process identifies features in the image (step 1202). This identification may be performed using various object recognition processes that are currently available. In the illustrative examples, step 1202 may include identifying features such as a person, a face of a person, a car, a stadium, a building, an animal, a piece of equipment, a piece of apparel, a piece of furniture, an aircraft, a spacecraft, a planet, a logo or some other suitable type of object. Additionally, in identifying features, colors in these features may also be identified in step 1202.

When the profile page is for a person, step 1202 may adjust the image to facilitate facial recognition. These adjustments may include at least one of one of changes to image histogram, image brightness, image contrast, image sharpness, or other suitable changes to the image to increase the ability to recognize faces in the image.

In performing the identification of features, one or more rules may be used in identifying features. These rules may provide waiting for different types of features. For example, if the profile page is for people, then the process may identify faces of people rather than trees, vehicles, or other features that may be found in the image.

When the desired feature is a face, step 1202 may implement a process for finding faces based on a policy. For example, a face in the image may be identified based on at least one of face size; percent visible; tag information in the image; facial recognition rules to identify different individuals; identity of the person for the profile page; content for the profile page; and other suitable rules or factors.

The process displays the identified features (step 1204). For example, images containing faces of people identified in the image may be displayed. Thereafter, the process receives user input selecting a feature (step 1206). For example, the selection of an image containing the face of a person may be used to identify a profile image for a profile page.

The process stores identification of features, a color scheme, a profile image, and other information identified from processing the image (step 1208), with the process terminating thereafter.

Figure 13:
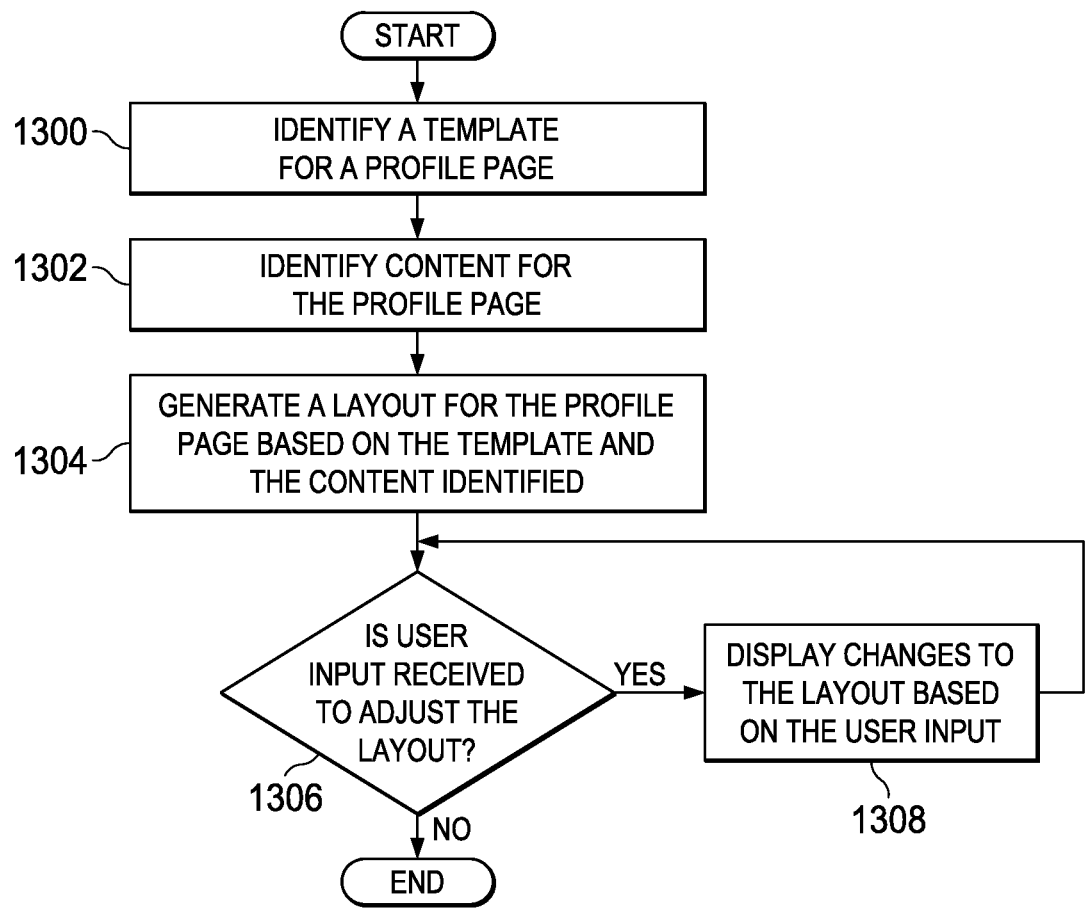
FIG. 13 is an illustration of a flowchart of a process for generating a layout in accordance with an illustrative embodiment.

Turning next to FIG. 13, an illustration of a flowchart of a process for generating a layout is depicted in accordance with an illustrative embodiment. The process illustrated in FIG. 13 may be implemented in layout generator 202 in profile generator 116 shown in block form in FIG. 2.

The process begins by identifying a template for a profile page (step 1300). In this illustrative example, the template may be a default layout. In other illustrative examples, the template may be a current profile page that is to be modified.

The process identifies content for the profile page (step 1302). This content may include information about the person for which the profile page is being generated. Information may include education, location, interests, images, and other suitable information that may be used as content for the profile page for a person. When the profile page is for a different type of object, the contents may be obtained from a product directory, a customer feedback site, a business database, or some other suitable source.

The process then generates a layout for the profile page based on the template and the content identified (step 1304). The process then determines whether user input is received to adjust the layout (step 1306). If user input is received to adjust the layout, changes to the layout are displayed based on the user input (step 1308). The process then returns to step 1306. With reference again step 1306, if user input is not received, the process terminates.

Figure 14:
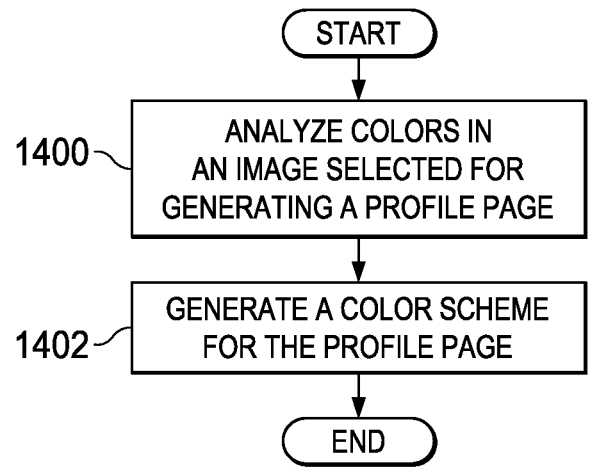
FIG. 14 is an illustration of a flowchart of a process for generating a color scheme for profile pages in accordance with an illustrative embodiment.

Turning now to FIG. 14, an illustration of a flowchart of a process for generating a color scheme for profile pages is depicted in accordance with an illustrative embodiment. The process illustrated in FIG. 14 may be implemented in color manager 204 in profile generator 116 shown in block form in FIG. 2.

The process begins by analyzing colors in an image selected for generating a profile page (step 1400). The process then generates a color scheme for the profile page (step 1402), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 15:
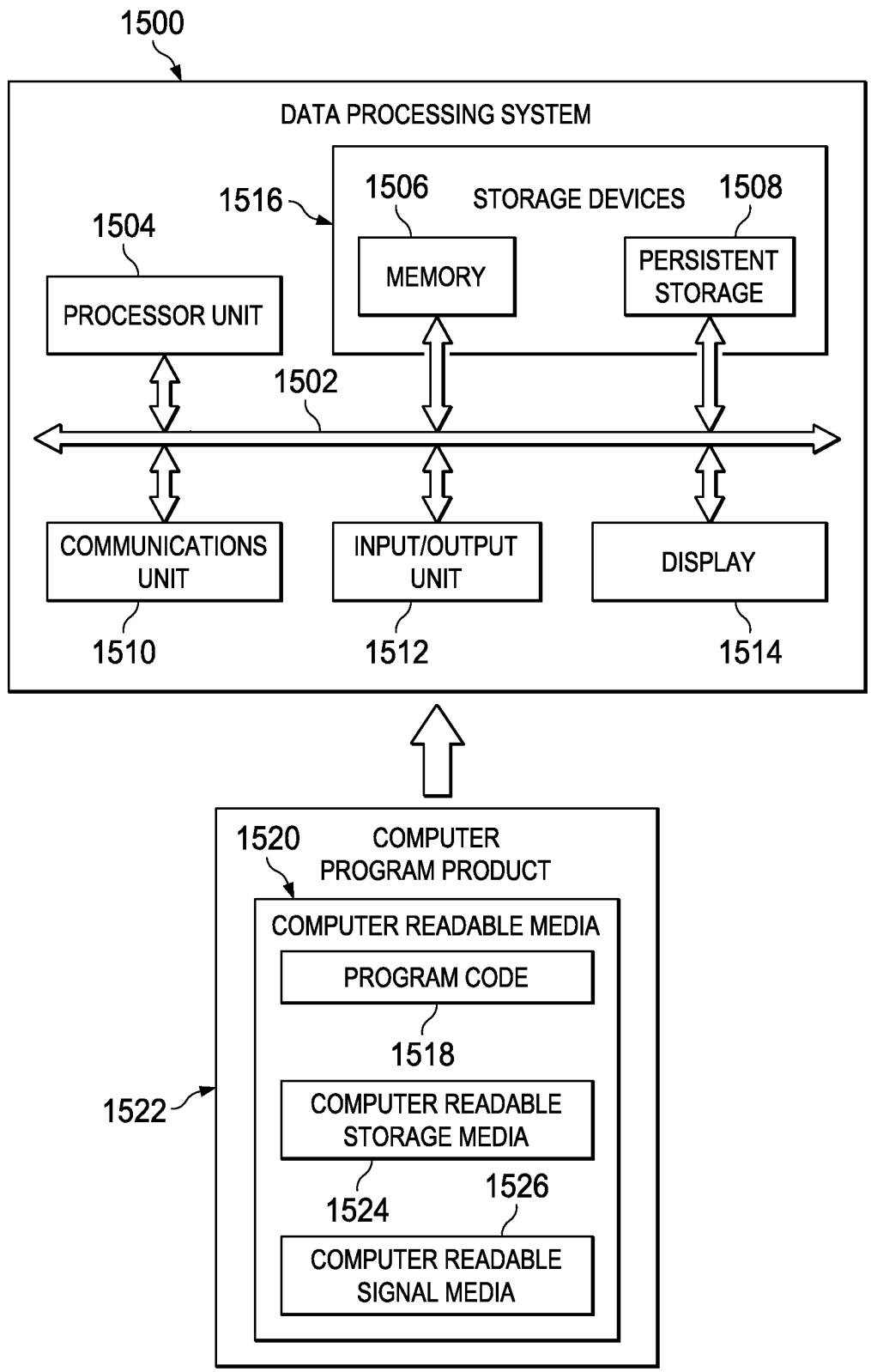
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement computer system 133 in FIG. 1. In this illustrative example, data processing system 1500 includes communications framework 1502, which provides communications between processor unit 1504, memory 1506, persistent storage 1508, communications unit 1510, input/output (I/O) unit 1512, and display 1514. In this example, communication framework may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518.

Alternatively, program code 1518 may be transferred to data processing system 1500 using computer readable signal media 1526. Computer readable signal media 1526 may be, for example, a propagated data signal containing program code 1518. For example, computer readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

Thus, the illustrative examples provide a method and apparatus for generating profile pages. With profile generator 116, computer system 133 is a special purpose computer that enables generation of profile pages 104 more quickly and easily as compared to currently used processes. For example, profile generator 116 may enable automatic generation of profile pages 104. Further, profile generator 116 also may allow for a user to make changes to the profile page that has been automatically generated.

In this manner, the illustrative examples solve a technical problem involving the amount of time needed to generate a profile page. As depicted, the illustrative examples reduce the amount of time needed to generate the profile page. Additionally, the illustrative examples may incorporate information from different sources to generate the profile page.

For example, an operator may use a group shot of people for which profile pages should be generated. With profile generator 116, the generation of profile pages for the people in the group shot may be more quickly generated as compared to currently used techniques. Further, profile pages for products also may be generated in this manner.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
    identifying, by a computer system, a plurality of potential profile images from an image, the plurality of potential profile images different than the image, and different from each other;
    identifying, by the computer system using a feature identifier of a profile generator, based on object recognition and color identification, a group of features in the image, the group of features including an object in the group of features recognized from the group of features, wherein the object is other than a person, and a group of colors identified from the object in the group of features, wherein the object is different from the image and the plurality of potential profile images;
    displaying, by the computer system on a graphical user interface, each of the plurality of potential profile images, wherein each of the plurality of potential profile images is displayed separately from the image and from each other;
    generating, by the computer system, a profile webpage, wherein the profile webpage includes:

an only one potential profile image selected from the plurality of potential profile images displayed on the graphical user interface; and the group of features in the image including the object in the group of features and the group of colors identified from the object in the group of features;

identifying, by the computer system using a color manager of the profile generator, a color scheme for the profile webpage based on the group of colors identified from the object in the group of features; and displaying, by the computer system on the graphical user interface, the profile webpage on a display system according to the color scheme identified from the object in the group of features.

2. The method of claim 1, wherein generating the profile webpage comprises:
creating a new profile webpage based on the only one potential profile image and the group of features identified from the image.

3. The method of claim 1, wherein generating the profile webpage comprises:
modifying a current profile webpage based on the only one potential profile image and the group of features identified from the image.

4. The method of claim 1, wherein identifying the plurality of potential profile images from the image comprises:
identifying a plurality of faces in the image; and
generating a first potential profile image from each face in the plurality of faces identified in the image.

5. The method of claim 4, wherein identifying the plurality of potential profile images from the image comprises:
identifying a plurality of objects in the image; and
generating a second potential profile image from each of the plurality of objects identified in the image.

6. The method of claim 1 further comprising:
receiving user input to adjust a layout of the profile webpage; and
adjusting a group of display parameters for the profile webpage based on the user input.

7. The method of claim 6, wherein the group of display parameters comprises at least two of:
a first position in the layout of the profile webpage, wherein the first position is of the only one potential profile image;
a second position in the layout of the profile webpage, wherein the second position is of content on the profile webpage; or
a third position in the layout of the profile webpage, wherein the third position is of a background image.

8. The method of claim 1, wherein the only one potential profile image is an image of a person for which the profile webpage is generated.

9. The method of claim 1, wherein the group of features comprises at least one of a color, a logo, a font, or a color scheme.

10. The method of claim 1, wherein displaying according to the color scheme comprises:
displaying button graphical elements of the profile webpage according to the color scheme identified from the group of features; and
displaying text graphical elements of the profile webpage according to the color scheme identified from the group of features.

11. The method of claim 1, further comprising:
identifying, by the computer system, a template for the profile webpage;

identifying, by the computer system, content for the profile webpage; and generating, by the computer system, a layout for the profile webpage based on the template and content, and wherein displaying, by the computer system, the profile webpage on the display system according to the color scheme identified from the group of features further comprises displaying, by the computer system, the profile webpage on the display system according to the layout for the profile webpage, wherein the color scheme is applied to the content.

12. A computer system comprising:
a display system including a graphical user interface; and
a profile generator in communication with the display system, the profile generator including a feature identifier, wherein the profile generator:
identifies a plurality of potential profile images from an image;
identifies, using the feature identifier of the profile generator, based on object recognition and color identification, a group of features in the image, the group of features including an object recognized from the group of features, wherein the object is other than a person, and a group of colors identified from the object in the group of features, wherein the object is different from the image and the plurality of potential profile images;
separately displays, on the graphical user interface, each of the plurality of potential profile images, wherein each of the plurality of potential profile images is displayed apart from the image and apart from each other, each of the plurality of potential profile images different from the image and different from each other;
generates a profile webpage that includes:
an only one potential profile image selected from the plurality of potential profile images displayed on the graphical user interface; and
the group of features in the image including the object in the group of features and the group of colors identified from the object in the group of features;
identifies, using a color manager of the profile generator, a color scheme for the profile webpage based on the group of colors identified from the object in the group of features; and
displays on the graphical user interface the profile webpage on the display system according to the color scheme identified from the object in the group of features.

13. The computer system of claim 12, wherein in generating the profile webpage, the profile generator creates a new profile webpage based on the only one potential profile image and the group of features identified from the image.

14. The computer system of claim 12, wherein in generating the profile webpage, the profile generator modifies a current profile webpage based on the only one potential profile image and the group of features identified from the image.

15. The computer system of claim 12, wherein in identifying the plurality of potential profile images from the image, the profile generator:
identifies a plurality of faces in the image; and
generates a first potential profile image from each face in the plurality of faces identified in the image.

16. The computer system of claim 15, wherein in identifying the plurality of potential profile images from the image, the profile generator:
   identifies a plurality of objects in the image; and
   generates a second potential profile image from each of the plurality of objects identified in the image.

17. The computer system of claim 12, wherein the profile generator:
   receives user input to adjust the profile webpage; and
   adjusts a group of parameters for the profile webpage based on the user input.

18. The computer system of claim 17, wherein the group of parameters comprises at least two of:
   a first position of the only one potential profile image;
   a second position of content on the profile webpage; or
   a third position of a background image.

19. The computer system of claim 12, wherein the only one potential profile image is an image of a person for which the profile webpage is generated.

20. The computer system of claim 12, wherein the group of features comprises at least one of a color, a logo, a font, or a color scheme.

21. The computer system of claim 12, wherein displaying according to the color scheme comprises:
   displaying button graphical elements of the profile webpage according to the color scheme identified from the group of features; and
   displaying text graphical elements of the profile webpage according to the color scheme identified from the group of features.

22. The computer system of claim 12, wherein the profile generator:
   identifies a template for the profile webpage;
   identifies content for the profile webpage; and
   generates a layout for the profile webpage based on the template and content, and
   wherein the profile generator displays the profile webpage on the display system according to the color scheme identified from the group of features and the layout generated from the template and content, wherein the color scheme is applied to the content.

23. A computer program product, comprising:
   a computer readable storage media;
   first program code, stored on the computer readable storage media, for identifying a plurality of potential profile images from an image, the plurality of potential profile images different than the image and different from each other;
   second program code, stored on the computer readable storage media, for identifying, using a feature identifier of a profile generator, based on object recognition and color identification, a group of features in the image, the group of features including an object in the group of features recognized from the group of features, wherein the object is other than a person, and a group of colors identified from the object in the group of features, wherein the object is different from the image and the plurality of potential profile images;
   third program code, stored on the computer readable storage media, for separately displaying on a graphical user interface each of the plurality of potential profile images, each of the plurality of potential profile images displayed separately from the image and separately from each other;
   fourth program code, stored on the computer readable storage media, for generating a profile webpage including an only one potential profile image selected from the plurality of potential profile images displayed on the graphical user interface, the group of features in the image including the object in the group of features and the group of colors identified from the object in the group of features;
   fifth program code, stored on the computer readable storage media, for identifying, using a color manager of the profile generator, a color scheme for the profile webpage based on the group of colors identified from the object in the group of features; and
   sixth program code, stored on the computer readable storage media, for displaying on the graphical user interface, the profile webpage on a display system according to the color scheme identified from the object in the group of features.

24. The computer program product of claim 23, wherein generating the profile webpage comprises:
   creating a new profile webpage based on the only one potential profile image and the group of features identified from the image.

25. The computer program product of claim 23, wherein generating the profile webpage comprises:
   modifying a current profile webpage based on the only one potential profile image and the group of features identified from the image.

26. The computer program product of claim 23, wherein the sixth program code comprises seventh program code for:
   displaying button graphical elements of the profile webpage according to the color scheme identified from the group of features; and
   displaying text graphical elements of the profile webpage according to the color scheme identified from the group of features.

27. The computer program product of claim 23, further comprising:
   seventh program code, stored on the computer readable storage media, for identifying, by a computer system, a template for the profile webpage;
   eighth program code, stored on the computer readable storage media, for identifying, by the computer system, content for the profile webpage;
   ninth program code, stored on the computer readable storage media, for generating, by the computer system, a layout for the profile webpage based on the template and content; and
   tenth program code, stored on the computer readable storage media, for displaying, by the computer system, the profile webpage on the display system according to the layout for the profile webpage, wherein the color scheme is applied to the content.

* * * * *